US009240029B2

(12) United States Patent
Lynch et al.

(10) Patent No.: US 9,240,029 B2
(45) Date of Patent: Jan. 19, 2016

(54) STREET LEVEL VIDEO SIMULATION DISPLAY SYSTEM AND METHOD

(75) Inventors: James Lynch, Chicago, IL (US); William Gale, Oak Park, IL (US); Bradley Kohlmeyer, Lisle, IL (US)

(73) Assignee: HERE Global B.V., Veldhoven (NL)

( * ) Notice: Subject to any disclaimer, the term of this patent is extended or adjusted under 35 U.S.C. 154(b) by 1288 days.

(21) Appl. No.: 11/796,899

(22) Filed: Apr. 30, 2007

(65) Prior Publication Data

US 2008/0266324 A1 Oct. 30, 2008

(51) Int. Cl.
*G06T 1/00* (2006.01)
*G01C 21/20* (2006.01)
*G01C 21/36* (2006.01)

(52) U.S. Cl.
CPC .............. *G06T 1/0007* (2013.01); *G01C 21/20* (2013.01); *G01C 21/3647* (2013.01)

(58) Field of Classification Search
CPC .......................... G01C 21/3647; G01C 22/006
USPC ............................. 345/634; 342/451; 701/211
See application file for complete search history.

(56) References Cited

U.S. PATENT DOCUMENTS

| | | | |
|---|---|---|---|
| 5,161,886 A | 11/1992 | De Jong et al. | 364/449 |
| 5,470,233 A * | 11/1995 | Fruchterman et al. | 434/112 |
| 5,774,569 A | 6/1998 | Waldenmaier | |
| 5,793,310 A * | 8/1998 | Watanabe et al. | 340/995.14 |
| 5,945,927 A * | 8/1999 | Nakayama et al. | 340/995.14 |
| 6,140,943 A * | 10/2000 | Levine | 340/995.12 |
| 6,222,583 B1 | 4/2001 | Matsumura et al. | |
| 6,289,278 B1 * | 9/2001 | Endo et al. | 701/208 |
| 6,293,798 B1 * | 9/2001 | Boyle et al. | 434/29 |
| 6,363,161 B2 | 3/2002 | Laumeyer et al. | |
| 6,452,544 B1 * | 9/2002 | Hakala et al. | 342/357.31 |
| 6,919,892 B1 * | 7/2005 | Cheiky et al. | 345/473 |
| 7,155,336 B2 | 12/2006 | Dorfman et al. | 701/200 |
| 7,216,035 B2 | 5/2007 | Hortner et al. | 701/211 |
| 7,389,181 B2 * | 6/2008 | Meadow et al. | 701/522 |
| 2002/0018070 A1 * | 2/2002 | Lanier | 345/629 |
| 2002/0049534 A1 * | 4/2002 | Yuda et al. | 701/209 |
| 2004/0098175 A1 | 5/2004 | Said et al. | 701/1 |
| 2005/0031169 A1 * | 2/2005 | Shulman et al. | 382/104 |
| 2006/0100774 A1 * | 5/2006 | Barkowski et al. | 701/200 |
| 2006/0167630 A1 * | 7/2006 | Noma et al. | 701/211 |
| 2006/0200277 A1 * | 9/2006 | Yoshida et al. | 701/1 |
| 2006/0287815 A1 * | 12/2006 | Gluck | 701/208 |
| 2007/0118281 A1 | 5/2007 | Adam et al. | |
| 2008/0039120 A1 * | 2/2008 | Gad | 455/456.2 |

\* cited by examiner

*Primary Examiner* — Mussa A Shaawat
*Assistant Examiner* — Kyung Kim
(74) *Attorney, Agent, or Firm* — Lempia Summerfield Katz LLC

(57) ABSTRACT

A system and method are disclosed for displaying video on a computing device for navigation and other purposes. Video data is collected by traveling along roads in a geographic area and storing the video data along with data indicating the positions at which the video data had been captured. This captured video data is then used in navigation systems and other devices that provide navigation, routing, or other features. A video is presented to a user on the display of a navigation system (or other device). An application associated with the navigation system uses the previously captured video data to create the video shown to the user. The application selects that video data that shows the end user's position from a vantage point. The application further superimposes an indication on the video at a location that corresponds to the position of the end user.

21 Claims, 7 Drawing Sheets

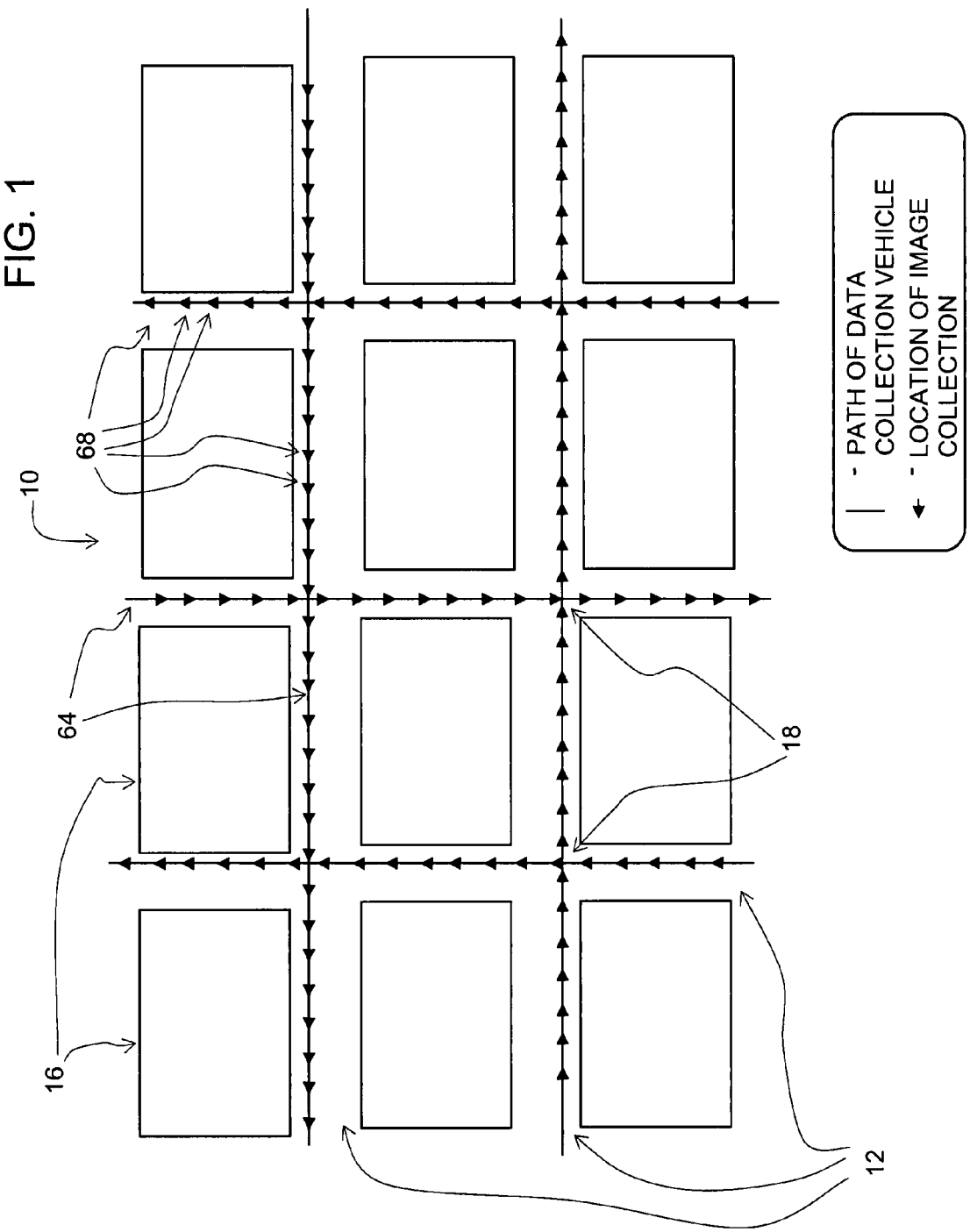

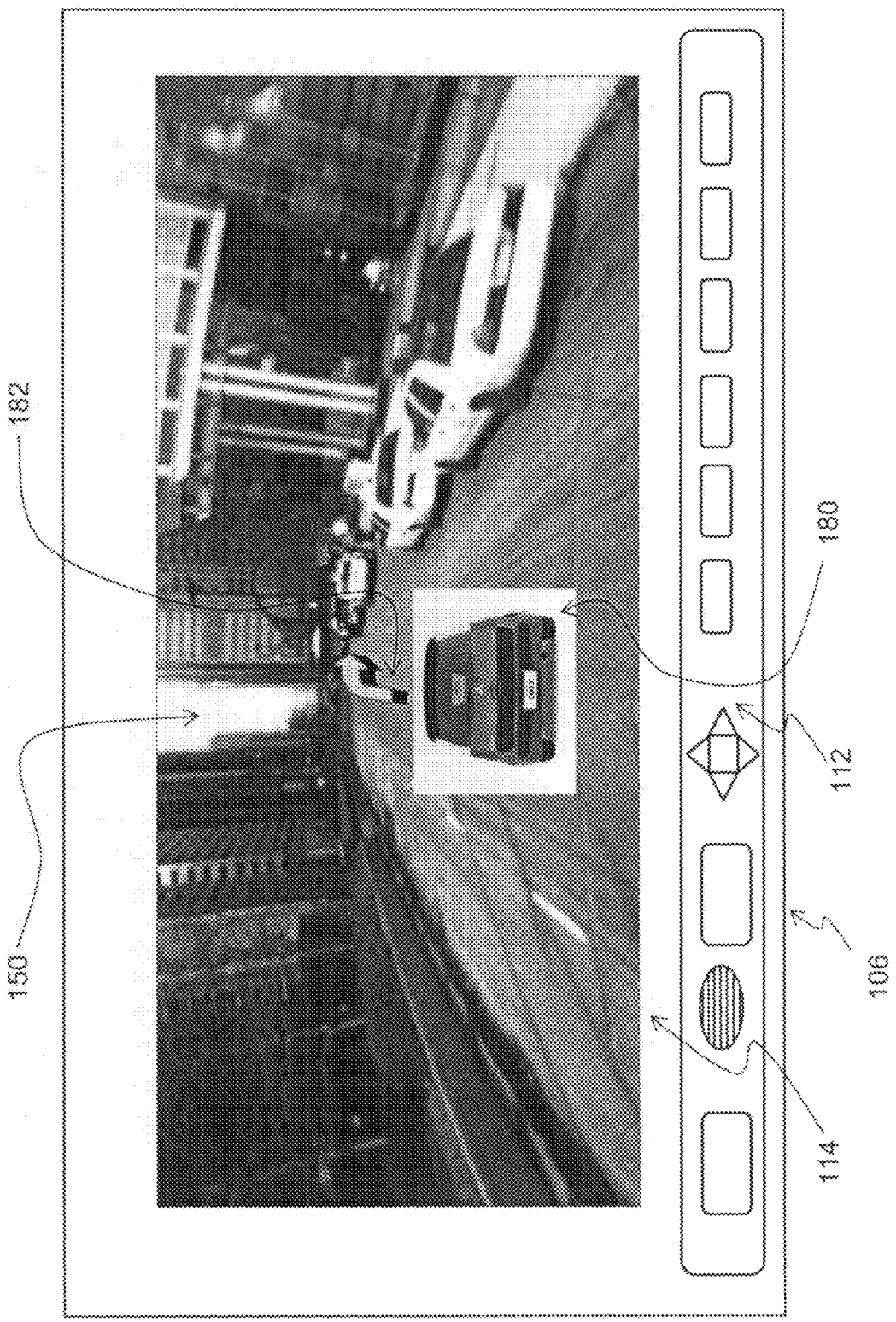

STREET LEVEL VIDEO SIMULATION DISPLAY SYSTEM AND METHOD

REFERENCE TO RELATED APPLICATIONS

The present application is related to the copending patent application Ser. No. 11/796,769 entitled "SYSTEM AND METHOD FOR STITCHING OF VIDEO FOR ROUTES" the entire disclosure of which is incorporated by reference herein.

BACKGROUND OF THE INVENTION

The present invention relates to displaying video image information on a computing device used for navigation and other purposes.

Various kinds of systems and applications are available that provide individuals with useful information for traveling. For example, navigation systems installed in vehicles provide useful information to vehicle drivers and passengers, including information for finding desired destinations, as well as guidance for following routes to desired destinations. Similar features are available on portable (e.g., handheld) devices, such as personal navigation systems, personal digital assistants with navigation functions and mobile phones. Useful navigation, routing, and map information is also available from various web sites.

Meaningful routing or navigation guidance includes helping a user ascertain his/her location and orientation relative to his/her surroundings. Helping a user ascertain his/her location and orientation relative to his/her surroundings is useful in order to indicate to a user which way to embark on a route, direct a user through an upcoming maneuver, show a user a landmark or useful location along a route, or show a user a desired destination.

U.S. Pat. No. 5,161,886 discloses a method for showing a perspective, or 3D, view of a vehicle's position on a map generated from two dimensional data. This type of view can be useful for helping a user determine his/her position relative to the road network and guiding the user to a desired destination.

Although the method disclosed in U.S. Pat. No. 5,161,886 is helpful, there exists room for improvement.

Accordingly, there is a need to provide additional features on navigation systems and other computing systems to help guide a user. Further, there is a need to provide ways to help a user know his/her position or orientation relative to his/her surroundings. There is a further need to provide information to a user to help locate or orient a user in his/her surroundings in a manner that efficiently uses computing resources. There exists an additional need to help inform a user about how to make an upcoming maneuver and to inform a user about locations along a route.

SUMMARY OF THE INVENTION

To address these and other objectives, the present invention includes a system and method for displaying video on a computing device for navigation and other purposes.

Video data is collected by traveling along roads in a geographic area and storing the video data along with data indicating the positions at which the video data had been captured. This captured video data is then used in navigation systems and other devices that provide navigation, routing, or other features. A video is presented to a user on the display of a navigation system (or other device). An application associated with the navigation system uses the previously captured video data to create the video shown to the user. The application selects that video data that shows the end user's position from a vantage point above and behind the end user. The application further superimposes an indication on the video at a location that corresponds to the position of the end user.

According to a further aspect, routing information is provided by associating the routing information with the indication of the end user's position that is superimposed on the video.

According to another aspect, advanced driver assistance applications may use the video that has the user's position superimposed thereon to provide warnings or other features.

BRIEF DESCRIPTION OF THE DRAWINGS

FIG. 1 is an overhead illustration of a portion of a geographic area.

FIG. 8 is a view of the display of the computing platform of FIG. 4 showing a video with an image of the end user's vehicle superimposed thereon with marking extending from the indication to indicate a maneuver.

DETAILED DESCRIPTION OF THE PRESENTLY PREFERRED EMBODIMENTS

I. Collection of Video Data

FIG. 1 is an overhead illustration of a portion 10 of a geographic area. A map developer collects data for a database that represents geographic features located in the geographic area. FIG. 1 shows roads 12 located in the geographic area. In this illustration, the roads 12 divide the area into blocks 16. Intersections 18 are formed where two (or more) roads 12 meet. FIG. 1 shows only several streets, blocks, and intersections. It is understood that the geographic area may include hundreds or thousands of streets, blocks and intersections. For example, the geographic area may include a metropolitan area, a state, county, country, or several countries. Also, it is understood that not all roads, blocks, and intersections in the geographic area are as regular as shown in FIG. 1. For example, roads may be wider or narrower (e.g., more or fewer lanes), roads may meet at various angles, blocks may be larger or smaller and more irregular in shape, and likewise intersections may be larger or smaller or irregular.

Figure 2:
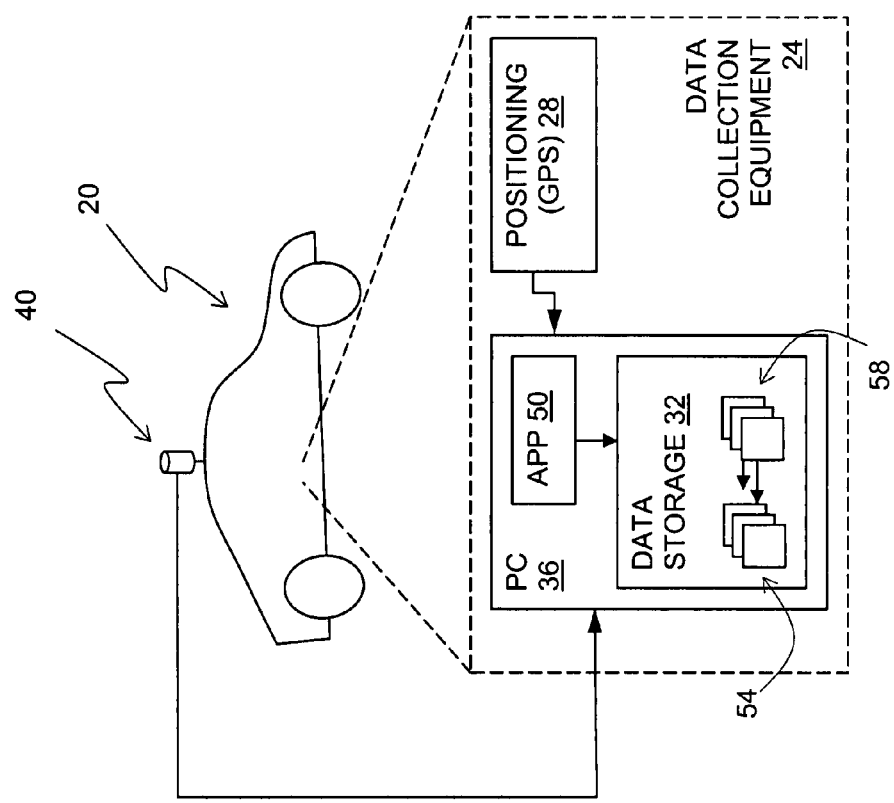
FIG. 2 is an illustration of a vehicle in which is installed data collection equipment used to collect data in the geographic area, a portion of which is shown in FIG. 1.

The map developer uses vehicles that are driven along the roads 12 to collect data about the geographic area. FIG. 2 shows one of the vehicles 20 used by the map developer to collect data. Installed in the vehicle 20 is data collection equipment 24. The data collection equipment 24 includes a combination of hardware and software. The data collection equipment 24 includes a positioning unit 28. The positioning unit 28 may be a GPS unit, or alternatively the positioning unit 28 may include an inertial sensor, or other equipment, that enables the position of the vehicle 20 to be determined. The position may be determined as geographic coordinates (latitude, longitude, and altitude), street addresses or any other way. The data collection equipment 24 also includes a data storage unit 32. In one embodiment, a hard disk drive of a portable personal computer 36 is used as the data storage unit 32. Alternatively, a separate data storage unit, such as an external hard disk drive, may be provided.

The data collection equipment 24 also includes a video camera 40. The video camera 40 is mounted on the vehicle 20 (e.g., on the roof) so that images can be taken in all directions (360° horizontally around the vehicle and up) from a vantage point that is approximately 2 meters above the ground. Thus, the video camera is mounted to obtain street-level video. The video is a street level (or near street level) because it is captured using data collection equipment located in a vehicle being driven along the road. The street level video closely matches what a person traveling along the street would observe (i.e., in all directions).

Figure 3:
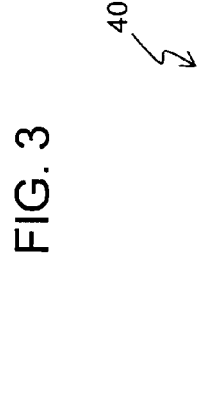
FIG. 3 is a perspective view of the camera shown in FIG. 2.

In one embodiment shown in FIG. 3, the video camera 40 includes six lenses. In one embodiment, the video camera is a Ladybug®2 spherical digital video camera, manufactured by Point Grey Research of Vancouver, BC, Canada, although other cameras may be used. As shown in FIG. 3, five of the lenses 44 on the camera 40 are oriented horizontally and one lens 48 is oriented upward. In other embodiments, cameras with more or fewer lenses may be used.

The data collection equipment 24 also includes a data collection application 50. The data collection application 50 is a software program that is executed on the personal computer 36. The video camera 40 and the positioning unit 28 are operatively connected to the personal computer 36. The data collection application 50 operates the video camera 40, the positioning unit 28 and the personal computer 36 to collect video data and position data on the data storage unit 32. More specifically, as the vehicle 20 is being driven along the roads (12 in FIG. 1), the data collection application 50 causes the video camera 40 to capture frames of video data as the vehicle is being driven along the roads 12 and to store the frames as data 54 on the data storage unit 32. Further, the data collection application 50 causes position information acquired from the positioning unit 28 to be stored as data 58 on the data storage unit 32. The data 58 acquired from the positioning unit 28 indicates the position (latitude, longitude, altitude) where the frames were captured. Thus, the data collection application 50 stores the frames and data that indicates the positions of the frames.

The data collection application 50 can be used to specify the frame capture (and storage) rate of the video camera 40. A suitable frame capture rate may be selected. The frame capture rate may be time-based or distance-based. For example, a frame rate of 3 frames per second may be chosen. Alternatively, the data collection application 50 may be used to specify a frame capture rate of every 10 meters. Faster and slower frame capture rates, either time-based or distance-based, may also be selected. According to another alternative, a combination of a time-based and distance-based frame capture rates may be selected. The frame capture rate may also be selected as a function of other factors, such as type of roads, weather, traffic, etc.

The rate at which the position data is acquired (and stored) may also be selected. The position data capture rate may be selected by the positioning unit 28, by the data collection application 50, or by other means. For example, the position data capture rate may be selected to be once per second. Alternatively, faster or slower position data capture rates may also be selected.

The position data is associated with the video frame data so that the position at which each video frame was captured is, or can be, determined. There are various ways that the position data may be matched to the video frames. One way is to associate each video frame with the most recently acquired position. Alternatively, the position of each video frame may be associated with a position that is interpolated between positions acquired by the positioning unit 28. According to another alternative, the video frame data and position data may each be associated with a capture time, which is then used to match the video frames to positions. According to still another alternative, since the video frames represent images that are captured in sequence, if the sequence is maintained when the frames are stored, then only some of the video frames need to be directly associated with positions. Those video frames not directly associated with positions may be assumed to represent positions located between those directly associated with positions. The data collection application 50 may also account for any processing delays between the video and position data collection data streams.

Referring again to FIG. 1, paths 64 are illustrated along the streets 12. As mentioned above in connection with FIG. 1, the map developer uses vehicles that are driven along the roads 12 in a geographic area to collect data. The paths 64 represent the paths that the vehicle (20 in FIG. 2) follows as it is driven along the roads 12 to collect video and position data. In FIG. 1, the paths are shown as straight lines. These straight paths indicate that, in many cases, the vehicle 20 is driven straight through the intersections 18 (i.e., instead of turning left or right). In general, a pattern of paths 64 is selected so that the vehicle 20 is driven along each road at least once (in one direction). However, in order to perform the data collection process efficiently, the pattern is chosen that reduces traveling on the same road more than once (in one direction). Of course, at some point along a road the vehicle path curves as the vehicle 20 turns to travel onto another road.

The map developer may use vehicles 20 equipped with data collection equipment (24 in FIG. 2) to collect video and corresponding position data on all the roads in the entire geographic area. Alternatively, the map developer may collect video and corresponding position data on the roads in only portions of the entire geographic area.

Still referring to FIG. 1, arrows 68 are shown at positions along each of the paths 64. The arrows 68 indicate the direction that the vehicle 20 is traveling along the corresponding path when it is being operated to collect video and position data. The arrows 68 also indicate positions along the roads at which a frame of video data was captured.

In one embodiment, the video frame captured at each position is a 360° panoramic video frame image. In other words, using a video camera that has multiple lenses mounted horizontally, and possibly a lens oriented vertically, each video frame is a 360° composite image viewed in all horizontal directions and up. In this embodiment, the data collection software 50 automatically stitches together the separate images acquired by each of the multiple camera lenses to form a single, 360° panoramic video frame image. Alternatively, the other kinds of video frames may be captured at positions along each of the roads, including multiple frames that are not automatically stitched together, wide-angle images, a fish eye lens, or even plain single-direction images.

One advantage of capturing 360° panoramic video is that the video can be played back to show travel in either direction. Travel in the reverse direction can be depicted by using the rearward orientation of the panoramic view and playing the frames back in the reverse order from the order in which they were captured. (Note that other vehicles and pedestrians will also be traveling in reverse.)

II. Use of Video Data for Navigation

Once the video data is captured, as described above, it can be used in various ways to support vehicle and/or pedestrian navigation applications.

Figure 4:
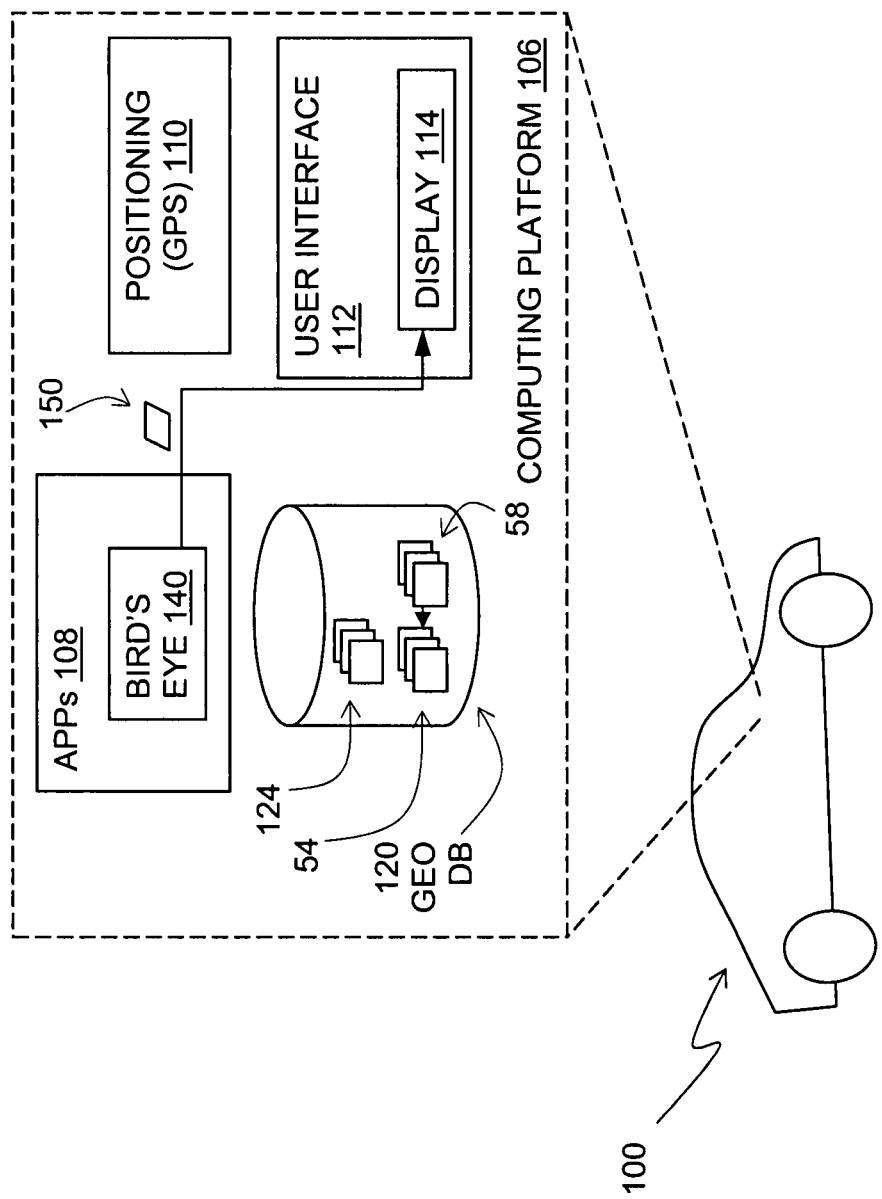
FIG. 4 illustrates an end user's vehicle in which is located a computing platform that uses the video data collected with the data collection system shown in FIG. 2.

Referring to FIG. 4, an end user's vehicle 100 is shown. Installed in the vehicle 100 is a computing platform 106. In this embodiment, the computing platform 106 is used to provide navigation-related features to the end user (i.e., a driver or passenger of the vehicle 100).

The computing platform 106 is a combination of hardware, software and data. In one embodiment, the computing platform 106 is an in-vehicle navigation system. In an alternative embodiment, the computing platform 106 may be a personal navigation device ("PND") such as a hand-held, portable device designed specifically for navigation purposes. In another alternative, the computing platform is a general purpose computing device, such as a personal digital assistant ("PDA") or portable personal computer in which is installed a navigation-related application and to which a positioning system, such as a GPS unit, is attached. In another alternative, the computing platform may be a mobile phone that provides navigation features. The computing platform 106 may be a standalone platform in which the hardware, software and data are all stored locally with the vehicle. Alternatively, the computing platform may be connected to a network. In a networked platform, some or all the functions may be provided by software, hardware or data located locally or remotely.

As stated above, the computing platform 106 is used to provide navigation-related functions. Navigation-related functions are provided by appropriate application software 108 and may include route calculation, route guidance, destination selection, electronic yellow pages, vehicle positioning, and map display. The computing platform 106 may perform additional functions or may provide only some of these functions.

The computing platform 106 includes a positioning unit 110. The positioning unit 110 may be a GPS unit, and may include inertial sensors, differential wheel speed sensors, a compass, or other equipment, that enables the position of the vehicle 100 to be determined. The positioning unit 110 operates with the navigation application software 108. The position may be determined as geographic coordinates (latitude, longitude, and altitude), street address or any other way.

The computing unit 106 also includes a user interface 112. The user interface 112 includes means that enable a user to enter information into the computing platform 106 and means by which the user can receive information from the computing platform 106. The user interface may include speakers, a microphone, a keypad, voice recognition software, etc. In this embodiment, the user interface 112 also includes a display 114.

The computing platform 106 uses a geographic database 120. The geographic database 120 includes data 124 about the geographic area in which the vehicle 100 is located. The geographic database 120 includes data collected by the map developer. In this embodiment, the geographic database 120 includes data about the roads in the geographic area, including data indicating the locations of the roads and intersections. The geographic database 120 may also include information about the names of the roads, one-way streets, number of lanes, locations of traffic signals and signs, speed limits, turn restrictions, address ranges, and so on. The geographic database 120 may also include information about points of interest, such as businesses, landmarks, museums, ATMs, government offices, and so on.

In one embodiment, the data in the geographic database 120 is in a format that is optimized for providing navigation-related functions. The geographic database 120 is formed by a compiler process that forms the database in the optimized format from a version of the database in a different format, such as a delivery format, like the GDF format. The version of the database in the delivery format, in turn, was formed by a compiler process that forms the delivery format from a different format that is optimized for data collection and updating.

In FIG. 4, the geographic database 120 includes the video data 54 and position data 58 collected by the data collection equipment (24 in FIG. 1). In the compiled geographic database 120 used to provide navigation-related features, the video data 54 and position data 58 may be in a different format than the format in which it was collected.

In this embodiment, the navigation application software 108 includes a bird's eye view feature 140. The bird's eye view feature 140 operates with the other applications among the navigation-related software applications 108. The bird's eye view feature 140 operates to provide a user of the computing platform 106 a video 150 on the display 114 showing an indication of the current position of the vehicle 100 along the road on which the vehicle is traveling from a vantage point above and behind the current location of the vehicle. The bird's eye view feature 140 uses data from the positioning unit 110, the video data 54, and position data 58, as well as possibly other data from the geographic database 120, to provide this video 150.

Figure 5:
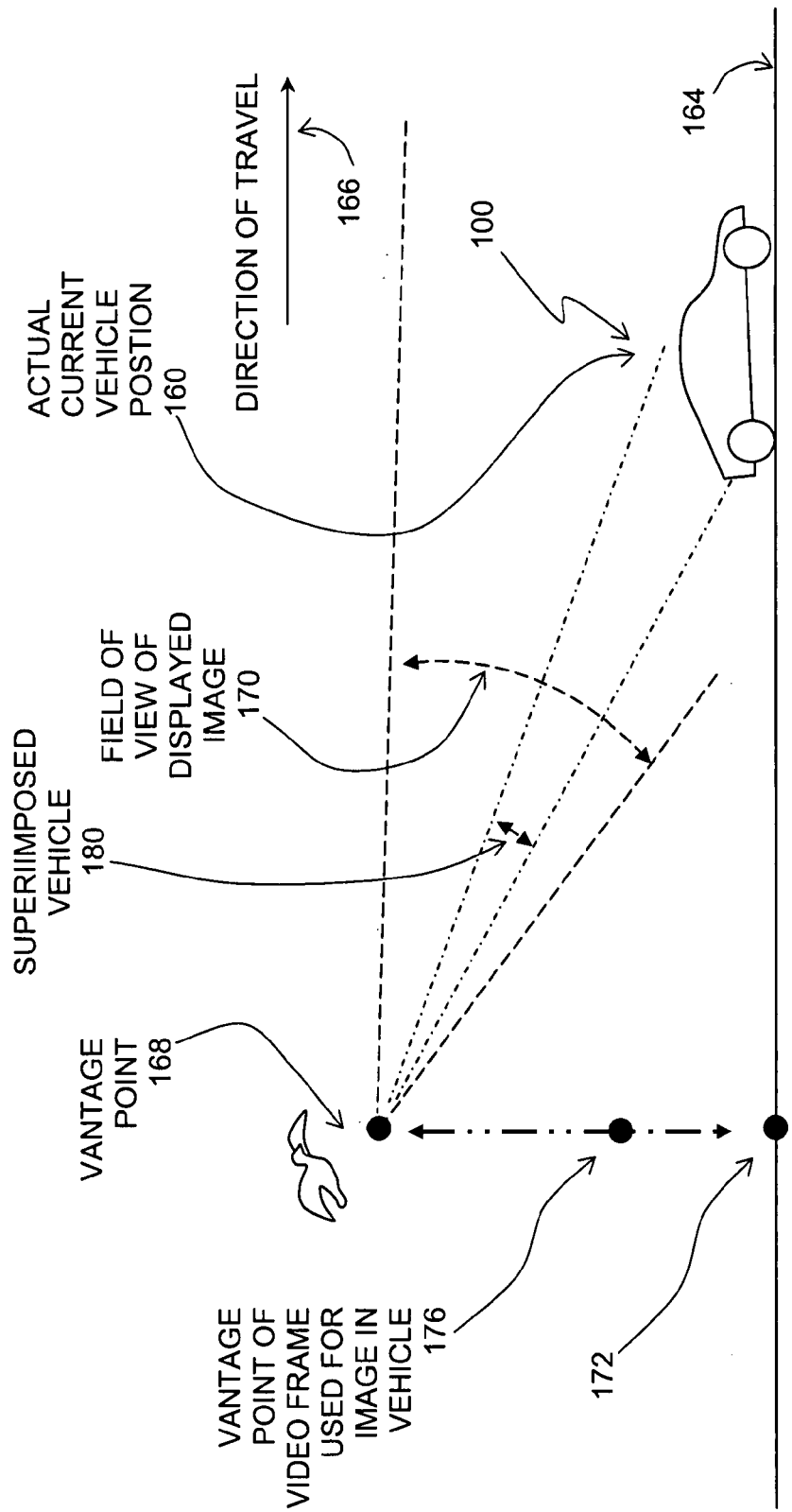
FIG. 5 is a side view of the end user's vehicle shown in FIG. 4 illustrating selection of a vantage point for the video to be displayed in the vehicle.

FIG. 5 illustrates the relationship between the vehicle 100 and the vantage point of the video formed by the bird's eye view feature 140. In FIG. 5, the vehicle 100 is shown at a position 160 along a road 164, which may be one of the roads (12 in FIG. 1) in the geographic area. The vehicle 100 is traveling in the direction of indicated by the arrow 166. The bird's eye view feature 140 selects a vantage point 168. The vantage point 168 is above and behind the vehicle 100 (in the direction of travel). The vantage point 168 is selected so that the vehicle 100 would be observable in a field of view 170 to a person looking along the road in the direction of travel.

The bird's eye view feature 140 determines a point 172 along the road 164 directly under the vantage point 168 and selects that video frame from the video data 54 that most closely matches the point 172.

If the video frame data is panoramic 360° view data, a portion of the video frame may be selected to match the direction of travel of the vehicle.

If desired, as an optional step, the bird's eye view feature 140 transforms (e.g., distorts) the video frame that matches the point 172 to make it appear as if the video were captured from a different (e.g., higher) position, than the position from which it actually had been captured. For example, if the video image corresponding to the position 172 had been captured by a video camera mounted on top of a vehicle (such as the video camera 40 mounted on top of the vehicle 20 in FIG. 2), the actual vantage point of the video image may be approximate 2 meters from the ground, e.g., approximately at a point 176. However, in order to make the video frame appear to have a higher vantage point, e.g., 5 meters, the video frame is transformed, e.g., distorted, to appear to have been captured from a higher point. As stated above, transformation of the video image is an optional step. In an alternative embodiment, the video image is not transformed, but used with a vantage point corresponding to where it had originally been captured (e.g., at point 176).

Once a video frame corresponding to the vantage point 168 is obtained, an image 180 of the vehicle 100 is superimposed onto the video image of the road 164. The image 180 of the vehicle is superimposed on the video image 150 to match where the vehicle would appear to be if a person were actually observing the road 164 from the vantage point 168 and observing the actual vehicle 100 on the road. In one embodiment, the image 180 of the vehicle shows the rear of the vehicle because this is the side of the vehicle that a person viewing the actual road 164 from the vantage point 168 would observe. In addition, according to one embodiment, the image 180 of the vehicle is selected to match the make, model and color of the actual vehicle 100. The image 180 of the vehicle may even include the end user's license plate number or other unique features.

Figure 6:
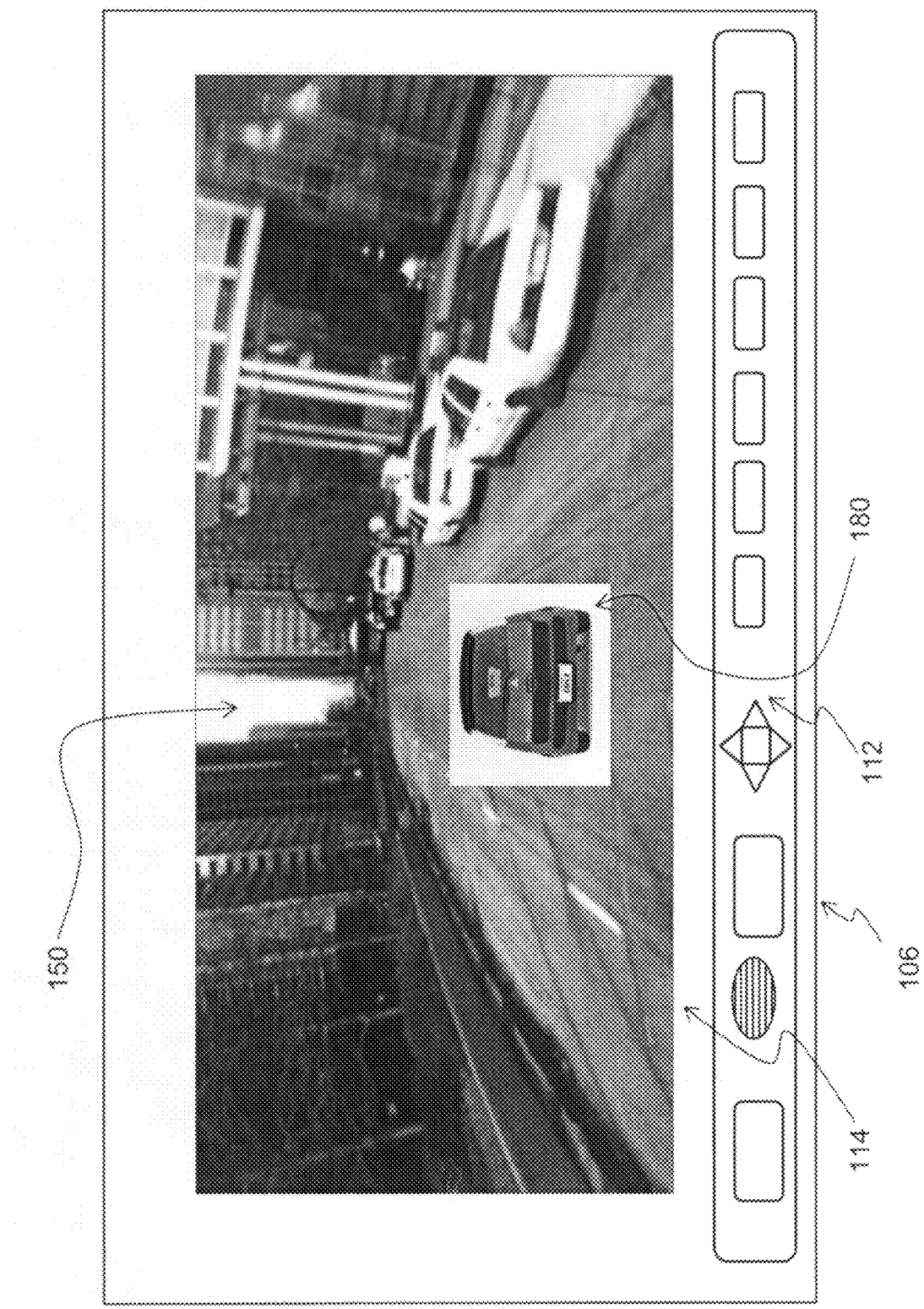
FIG. 6 is a view of the display of the computing platform of FIG. 4 showing a video with an image of the end user's vehicle superimposed thereon.

The video 150 with the superimposed image 180 of the vehicle is presented on the display 114 of the computing platform 106. FIG. 6 shows the display 114 of the computing platform 106 with the video 150 of the road and the superimposed image 180 of the vehicle shown thereon. (Note that the lighter shade box surrounding the superimposed image 180 in FIG. 6 is included for illustration purposes and would not necessarily be included in the actual image on the actual display presented to an end user.)

As the actual vehicle 100 travels along the road 164, as well as upon other roads, the video 150 presented on the display 114 is updated to match the changing position of the vehicle 100. Because the video frame data 54 contains images for positions that are relatively close together, the video images presented on the display appear to show continuous movement. The position of the superimposed image 180 is updated accordingly.

Use of the Street Level Simulation Video to Indicate Routing Maneuvers

Figure 7A:
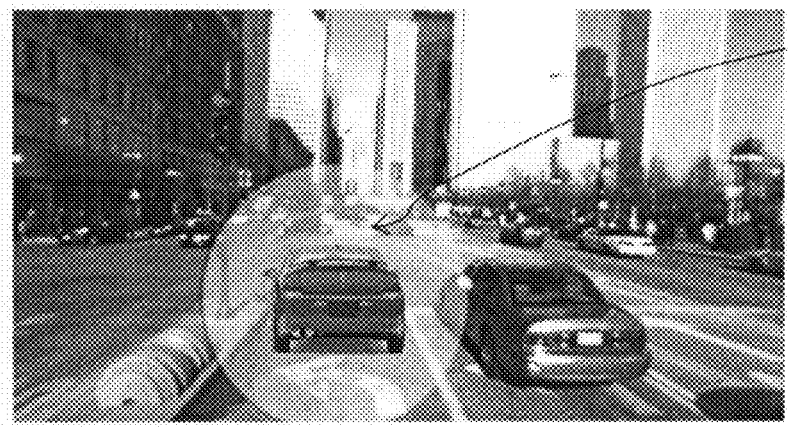
FIGS. 7A-7C are views of the display of the computing platform of FIG. 4 showing a video with an image of the end user's vehicle superimposed thereon performing a maneuver.
Figure 7B:
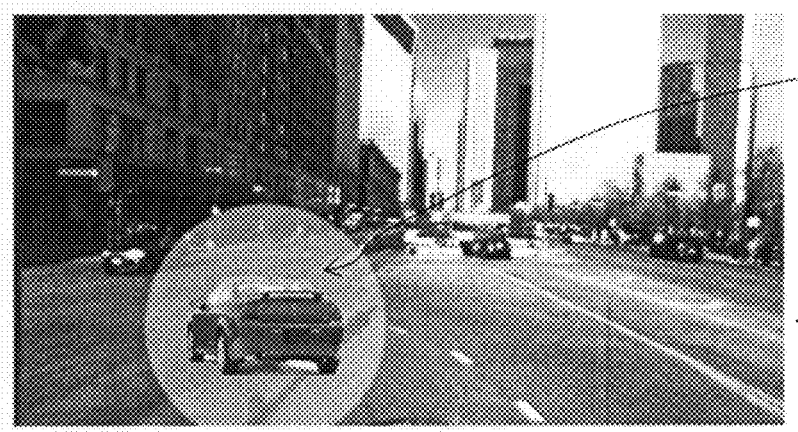
Figure 7C:

One of the uses of the street level video is to indicate routing maneuvers to an end user. Routing maneuvers may be indicated by associating the maneuver with the superimposed image of the vehicle. For example, in order to indicate to the user to turn right at an upcoming intersection, the bird's eye view feature 140 can cause the superimposed image of the vehicle to maneuver through the right turn on the video. FIGS. 7A-7C show the image 180 of the vehicle superimposed on the video shown on the display 114 and being caused to maneuver through an upcoming turn. (Note that the lighter shade circles surrounding the superimposed image 180 in FIGS. 7A-7C are included for illustration purposes and would not necessarily be included in the actual image on the actual display presented to an end user.) According to another embodiment, in order to indicate to the user to turn onto an exit ramp ahead, the bird's eye view feature 140 can cause the superimposed image of the vehicle to move into the right lane, and then turn onto the exit ramp on the video.

Various other alternatives may be used to indicate maneuvers. For example, instead of showing the superimposed image of the vehicle making the maneuver, an arrow, dashes, an animation, or other marking may extend from the superimposed image of the vehicle to indicate the maneuver on the video. FIG. 8 shows an example of a superimposed image of a vehicle with a superimposed arrow 182 indicating an upcoming maneuver through a turn. (Note that the lighter shade box surrounding the superimposed image 180 in FIG. 8 is included for illustration purposes and would not necessarily be included in the actual image on the actual display presented to an end user.)

Use of the Street Level Simulation Video to Indicate Orientation

Another use of the street level simulation video is to provide a user with orientation relative to his/her surroundings. By presenting a user with video from a vantage point at or slightly above street level and showing the user's vehicle relative to the surroundings, the user can readily grasp where he/she is and which direction he/she is going. The use of street level video provides meaningful information, such as buildings, storefronts, addresses, street signs, lane configurations, landmarks, cross streets, and so on.

Use of the Street Level Simulation Video to Indicate Destination Arrival

Another use of the street level video is to provide a user with clear information about arrival at a destination. By presenting a video showing the actual appearance of the destination, a user may easily observe an entrance way, storefront, parking (or no-parking zones), driveways, or other information that may not be readily apparent from map data alone.

III. Other Embodiments

A. Pedestrian and Other Types of Navigation

In the above embodiments, it was described how video collected by a video camera mounted on a vehicle could later be used on a computer platform in an end user's vehicle to provide meaningful information to the end user about the location and orientation of the end user's vehicle along a road on which the end user was traveling. In an alternative embodiment, video may also be used to assist pedestrians. According to this alternative, a pedestrian carries a portable computing platform that has a display on which video can be shown. The portable computing platform may be a mobile phone, a personal digital assistant with navigation application software or a personal navigation system. The portable computing device carried by the pedestrian may use previously obtained video data in the same or similar way, as described above for vehicles. In the case of a pedestrian, the indication of location of the computing platform, which would be superimposed on the display, would not use an image of a vehicle. Instead, a generic symbol, such as an arrow, may be used. Alternatively, an image of a person may be superimposed on the display at a location corresponding to the location of the computing platform. According to one alternative, the user may select an image of himself/herself, or an image that resembles himself/herself, or any other type of image.

Routing maneuvers may be indicated to pedestrians in a similar way that routing maneuvers are indicated to motorists. The superimposed image of the pedestrian may be shown simulating walking through an upcoming maneuver. Alternatively, instead of having the superimposed image of the pedestrian simulating walking through a maneuver, arrows, dashes, or animations may be used. Alternatively, footprints may be superimposed on the video image to indicate where a pedestrian should walk to follow a route.

Pedestrian navigation may be supported using the same street level video obtained by driving a vehicle with data collection equipment along roads in a geographic area, as described above. Pedestrian navigation may also be supported by collecting additional street level video captured with a video camera, and possibly data collection equipment, carried by a person on foot. The video camera and data collection equipment may be the same as, or similar to, the video camera and data collection equipment used in a vehicle for collection of street level video and position data, as described above. A person on foot carrying a video camera and data collection equipment may collect video data along sidewalks, pedestrian-only walkways, paths, inside buildings, on train and subway platforms, and so on. Such pedestrian-collected video may be useful for providing guidance to pedestrians.

In addition to pedestrian travel, alternative embodiments may be used for travel by bicycle, motorcycle, bus, train, truck, scooter, roller skates, skateboards, segways, etc.

B. Use of Street Level Video for ADAS

The street level video may also be used for Advanced Driver Assistance System ("ADAS") applications. These applications have been developed to improve the comfort, efficiency, and overall satisfaction of driving. Examples of advanced driver assistance systems include adaptive headlight aiming, adaptive cruise control, and adaptive shift control, as well as others. Some of these advanced driver assistance systems use digital map data, in addition to variety of sensor mechanisms in the vehicle, to determine the current state of a vehicle and the current state of the environment around the vehicle.

The street level video may be used for various ADAS warning applications, such as obstacle or curve warning applications. For example, the street level video data may show a sharp turn ahead, relative to a superimposed image of the vehicle. Alternatively, the simulated street level video data may be used to show crosswalks, school crossings, posts, abutments, etc., relative to a superimposed image of the vehicle.

C. Other

In an above embodiment, it was disclosed that the image of the vehicle that is superimposed on the video frames presented on the end user's display matches the make, model and color of the actual vehicle. In an alternative embodiment, the image superimposed on the video frames presented on the end user's display may not match the end user's actual vehicle. Instead a mark, such as an arrow or other shape, may be superimposed on the video frames at a location corresponding to the end user's position. According to still another alternative, a generic vehicle may be used. According to still other alternatives, the end user may select the mark or vehicle to be used to superimpose on the video frames to indicate the end user's position.

In an above embodiment, it was disclosed that the system that displays a bird's eye view of a user along a road includes a positioning unit. In alternative embodiments, the system may omit having a positioning system. According to one alternative, a user may indicate his/her location or the location of the vehicle that is superimposed on the video frames presented on the display.

In an embodiment disclosed above, it was stated that the vantage point for selecting video to be shown to the user is determined to be a location above and behind the user's current position. In an alternative, the location of the vantage point can be chosen to be closer or further from the user's current position.

When the bird's eye view feature is used to depict the end user's vehicle maneuvering through a turn, the stitching feature disclosed in the copending application entitled "SYSTEM AND METHOD FOR STITCHING OF VIDEO FOR ROUTES" Attorney Docket No. N0251, may be used to form the video that shows the turn.

The bird's eye view feature may be used for purposes other than navigation, such as in video or computer games.

It was disclosed above that video data could be collected by a map developer that used vehicles equipped with data collection equipment to travel on roads in a geographic area to collect the video data. Video data could be collected in other ways. For example, video data could be collected using probe vehicles. Probe vehicles are vehicles operated by parties other than the map developer, but that are equipped to collect data while they are being used for purposes other than data collection. For example, vehicles used by private persons for day-to-day commuting could be used as probe vehicles. Alternatively, service vehicles, such as police, postal, taxi, delivery, or public transportation vehicles, could be used as probe vehicles. Data recorded by probe vehicles is sent to a map developer where it can be processed and used.

It is intended that the foregoing detailed description be regarded as illustrative rather than limiting and that it is understood that the following claims including all equivalents are intended to define the scope of the invention.

We claim:

1. A method for displaying information on a computing device comprising:
   determining a current position of the computing device in a vehicle being driven along a road;
   selecting a video frame based on the current position of the computing device;
   presenting a video including the video frame on a display of the computing device,
   wherein the video presented on the display of the computing device shows the road and is entirely derived from video data that had been previously obtained from a video camera mounted to a data collection vehicle being driven along the road,
   wherein no video other than video previously obtained via the data collection vehicle is presented on the display when the video is presented, the data collection vehicle different than the vehicle having the display,
   wherein the video being presented on the display of the computing device has a vantage point above and behind the current position of the computing device;
   superimposing an indication on the video being presented on the display of the computing device, and
   wherein the indication is superimposed on the video at a location corresponding to the current position of the computing device along the road,
   indicating a maneuver by associating the maneuver with the indication superimposed on the video.

2. The method of claim 1 wherein the vantage point is above and behind the current position of the computing device based on a direction of travel of the computing device along the road.

3. The method of claim 1 further comprising:
   determining a direction of travel of the computing device.

4. The method of claim 1 wherein the computing device is located in a vehicle.

5. The method of claim 4 wherein the indication is in the shape of a vehicle.

6. The method of claim 4 wherein the indication is in the shape of a vehicle that matches the make, model and color of the vehicle in which the computing device is located.

7. The method of claim 1 further comprising:
   prior to presenting the video on the display, transforming the video so that the vantage point appears higher than the vantage point at which the video had been obtained from a video camera mounted to the data collection vehicle.

8. The method of claim 1 wherein the computing device is carried by a pedestrian.

9. The method of claim 8 wherein the indication is in the shape of a person.

10. The method of claim 8 wherein the indication is in the shape of a person that matches the appearance of the pedestrian carrying the computing device.

11. The method of claim 1 wherein the maneuver is indicated by causing the indication superimposed on the video to perform the maneuver.

12. The method of claim 1 wherein the maneuver is indicated by causing a marking to extend from the indication superimposed on the video through the maneuver.

13. A computer-based system for displaying information for traveling comprising:
   a display in a user's vehicle;
   a positioning unit configured to determine a position of the user's vehicle and generate data indicating the position of the user's vehicle;
   video data that shows travel along a road, wherein the video data had been previously captured from a video camera on a collection vehicle being driven along the road that is different than the user's vehicle; and
   an application that selects a portion of the video data according to the data indicating the position of the user's vehicle and uses the video data to show a video on the display and superimposes on the video an indication of the position of the user's vehicle relative to surroundings being displayed on the video, the video shown on the display being recorded video entirely derived from the video data previously captured,
   wherein no video other than video previously captured from the collection vehicle is presented on the display when the video is shown, and the video being presented on the display of the computing device has a vantage point above and behind the current position of the computing device; and the application superimposes routing maneuverers on the video using an image corresponding to the user's vehicle.

14. The computer-based system of claim 13 wherein the indication shows the user's vehicle.

15. The computer-based system of claim 13 wherein the indication shows a vehicle.

16. The computer-based system of claim 13 wherein the application further indicates an upcoming maneuver by associating the maneuver with the indication.

17. The computer-based system of claim 13 wherein the application further indicates an upcoming maneuver by causing the indication to perform the maneuver on the video.

18. The computer-based system of claim 13 wherein the application further indicates an upcoming maneuver by causing markings to extend from the indication.

19. A computer-based system for displaying information for traveling comprising:
   a display carried by a pedestrian user;
   a positioning unit configured to determine a position of the pedestrian user;
   video data that shows travel along a road, wherein the video data had been previously captured from a video camera on a vehicle being driven along the road; and
   an application that uses the video data to show a video on the display and superimposes on the video an indication, in the shape of a person, of the pedestrian user's position relative to the surrounding being displayed on the video,
   wherein the video being shown is based solely on the video data previously captured, wherein no video other than video previously captured from the vehicle is presented on the display when the video is shown.

20. The computer-based system of claim 19 wherein the indication shows a pedestrian.

21. A method for displaying information on a computing device comprising:
   determining a current position of the computing device in a vehicle being driven along a road;
   selecting a video frame based on the current position of the computing device;
   presenting a video including the video frame on a display of the computing device,
   wherein the video presented on the display of the computing device shows the road and is entirely derived from video data that had been previously obtained from a video camera mounted to a data collection vehicle being driven along the road,
   wherein no video other than video previously obtained via the data collection vehicle is presented on the display when the video is presented, the data collection vehicle different than the vehicle having the display,
   wherein the video being presented on the display of the computing device has a vantage point above and behind the current position of the computing device; and
   superimposing an indication on the video being presented on the display of the computing device,
   wherein the indication is superimposed on the video at a location corresponding to the current position of the computing device along the road,
   wherein the computing device is carried by a pedestrian and the indication is in the shape of a person.

* * * * *